United States Patent
Karstadt et al.

(10) Patent No.: US 12,012,861 B2
(45) Date of Patent: Jun. 18, 2024

(54) CARTRIDGE FOR PULSE-SEPARATED VARIABLE TURBINE GEOMETRY TURBOCHARGERS

(71) Applicant: BorgWarner Inc., Auburn Hills, MI (US)

(72) Inventors: Sascha Karstadt, Undenheim (DE); Sascha Weiske, Weilerbach (DE); Cathrin Bergner, Bensheim (DE); Marc Gugau, Frei-Laubersheim (DE); Ahmet Coksen, Mannheim (DE); Uwe Tomm, Goellheim (DE); Frank Kruse, Langenstein (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/760,077

(22) PCT Filed: Sep. 8, 2016

(86) PCT No.: PCT/US2016/050611
§ 371 (c)(1),
(2) Date: Mar. 14, 2018

(87) PCT Pub. No.: WO2017/048568
PCT Pub. Date: Mar. 23, 2017

(65) Prior Publication Data
US 2018/0266268 A1 Sep. 20, 2018

Related U.S. Application Data

(60) Provisional application No. 62/219,245, filed on Sep. 16, 2015.

(51) Int. Cl.
*F01D 17/16* (2006.01)
*F01D 9/02* (2006.01)
(Continued)

(52) U.S. Cl.
CPC .......... *F01D 17/165* (2013.01); *F01D 9/026* (2013.01); *F01D 9/041* (2013.01); *F02C 6/12* (2013.01);
(Continued)

(58) Field of Classification Search
CPC ........ F01D 9/026; F01D 9/041; F01D 17/165; F02C 6/12; F05D 2220/40; F05D 2240/128
See application file for complete search history.

(56) References Cited

U.S. PATENT DOCUMENTS 4,008,010 A * 2/1977 Fauconnet ............... F03B 3/10
417/405
4,177,005 A * 12/1979 Bozung ................. F01D 9/026
415/128
(Continued)

FOREIGN PATENT DOCUMENTS

CN 102482990 A 5/2012
CN 103742204 A 4/2014
(Continued)

OTHER PUBLICATIONS

Machine translation of JP 2007-309140 A (Nov. 29, 2007) (Year: 2007).*
(Continued)

*Primary Examiner* — Christopher R Legendre
(74) *Attorney, Agent, or Firm* — Eric L. Doyle; Stephan A. Pendorf; Patent Central LLC

(57) ABSTRACT

A cartridge for use in a pulse energy enhanced turbine of a turbocharger. At least first and second fixed separating blades (12) are provided between a nozzle ring (6) and a disk (29), the separating blades (12) maintaining separation of exhaust gas flows through a guide grid between a divided volute and a turbine wheel (11). Exhaust pulsation energy (Continued)

from different cylinders or cylinder groups of an engine or engine bank are kept separated up to the turbine wheel, so that the turbine wheel reacts to individual pulses of exhaust gas flow from engine exhaust ports.

4 Claims, 13 Drawing Sheets

(51) Int. Cl.
*F01D 9/04* (2006.01)
*F02C 6/12* (2006.01)

(52) U.S. Cl.
CPC .... *F05D 2220/40* (2013.01); *F05D 2240/121* (2013.01); *F05D 2240/122* (2013.01); *F05D 2240/128* (2013.01); *F05D 2240/14* (2013.01)

(56) References Cited

U.S. PATENT DOCUMENTS

| | | | | |
|---|---|---|---|---|
| 4,362,020 | A * | 12/1982 | Meacher | F01D 25/22 290/52 |
| 6,260,358 | B1 * | 7/2001 | Daudel | F02B 37/02 415/42 |
| 6,558,117 | B1 * | 5/2003 | Fukaya | F01D 17/165 415/160 |
| 6,916,153 | B2 | 7/2005 | Boening | |
| 7,886,536 | B2 | 2/2011 | Hemer | |
| 8,702,381 | B2 | 4/2014 | Alajbegovic et al. | |
| 8,997,485 | B2 * | 4/2015 | Sumser | F01D 9/026 415/151 |
| 9,021,803 | B2 * | 5/2015 | Hirth | F01D 17/141 60/602 |
| 9,121,345 | B2 * | 9/2015 | Hirth | F01D 17/141 |
| 9,429,162 | B2 * | 8/2016 | Houst | F01D 9/026 |
| 10,227,889 | B2 * | 3/2019 | Arnold | F01D 5/043 |
| 2008/0038110 | A1 * | 2/2008 | Roberts | F01D 9/026 415/191 |
| 2012/0159946 | A1 * | 6/2012 | Sauerstein | F01D 9/026 60/598 |
| 2016/0115802 | A1 | 4/2016 | Grissom et al. | |
| 2018/0266268 | A1 * | 9/2018 | Karstadt | F01D 17/165 |

FOREIGN PATENT DOCUMENTS

| | | | |
|---|---|---|---|
| JP | 2007309140 A * | 11/2007 | |
| SU | 1271987 A1 * | 11/1986 | .......... F01D 17/165 |
| WO | WO2010068557 A2 | 6/2010 | |
| WO | WO2014193779 A1 | 12/2014 | |
| WO | 2015026654 A1 | 2/2015 | |

OTHER PUBLICATIONS

International Search Report for PCT/US2016/050611 with mailing date of Feb. 6, 2017.
Japanese Office Action (with English language translation) dated Aug. 7, 2018, in Japanese Application No. 2018-513602.
Chinese Office Action (with English language translation) dated May 21, 2019, in Chinese Application No. 201680053221.2.
Japanese Office Action (with English language translation) dated Apr. 23, 2018, in Japanese Application No. 2018-513602.

* cited by examiner

CARTRIDGE FOR PULSE-SEPARATED VARIABLE TURBINE GEOMETRY TURBOCHARGERS

BACKGROUND OF THE INVENTION

Field of the Invention

This invention relates to measures for improving efficiency of vane cartridges used in variable turbine geometry (VTG) turbochargers. The cartridges are designed to avoid or minimize leakage, to maximize back pressure and improve VTG angle while maintaining pulse separation.

Description of the Related Art

The turbocharging of engines is no longer primarily seen from a high power performance perspective, but is rather viewed as a means of reducing fuel consumption and environmental pollution. In turbocharged engines, combustion air is pre-compressed before being supplied to the engine. The engine aspirates the same volume of air-fuel mixture as a naturally aspirated engine, but due to the higher pressure, thus higher density, more air and fuel mass is supplied into a combustion chamber. Consequently, more fuel can be burned, so that the engine's power output increases.

The compressor is powered by exhaust gas. Exhaust gas exiting the engine is routed into a turbine housing and the heat and volumetric flow of exhaust gas spins a turbine wheel within the housing, which in turn drives a compressor wheel within a compressor housing of the turbocharger. On the one hand, during operation of a vehicle in traffic, the engine exhaust output varies over a broad range. On the other hand, the required compressor output, and thus the energy required to drive the compressor at any particular operating condition, varies over a broad range. The capacity of the turbine to output power does not always match the requirement of the compressor. To better match turbine to compressor operation, it is often desirable to control the speed and angle of flow of exhaust gas to the turbine wheel to improve the efficiency or extend the operational range of the turbocharger. Variable turbine geometry turbochargers (VTGs) have been configured to address this need. A type of such VTG is one having a variable exhaust nozzle, referred to as a variable nozzle turbocharger (VNT). Different configurations of variable nozzles have been employed in variable nozzle turbochargers to control the exhaust gas flow. One approach taken to achieve exhaust gas flow control in such VTGs involves the use of multiple pivoting vanes that are positioned annularly around the turbine inlet, sandwiched between a pair of axially-spaced, concentrically-mounted rings. The space between adjacent vanes form the nozzles, which change in direction and cross-section as the blades pivot. The pivoting vanes are collectively controlled in unison to alter the throat area of the passages between the vanes, thereby functioning to control the exhaust gas flow into the turbine.

When the guide vanes are in a fully "open" position, the turbine is adapted to operate at its maximum flow rate and the velocity vector of the flow has a large centripetal component. When the guide vanes are in a "closed" position, the high circumferential components of the flow speed and a steep enthalpy gradient lead to a high turbine output and therefore to a high charging pressure. Restriction increases back pressure and flow velocity through narrow nozzles and reduces lag at slow speeds while opening prevents exhaust gas backpressure at higher speeds. The entire exhaust gas flow is always directed through the turbine and can be converted to output. Adjustments of the guide vanes can be controlled by various pneumatic or electrical regulators.

An exemplary VTG turbocharger known from U.S. Pat. No. 7,886,536 (Hemer) includes a compressor housing and a turbine housing linked by a bearing housing, with a rotating shaft supported in the bearing housing. In the turbine housing adjustable guide vanes are pivotably mounted between a vane bearing ring and a thrust-and-bearing ring which is kept at a certain distance from the vane bearing ring by spacers. The vanes are adjustable through an actuator that actuates a unison ring. A rotary motion of the unison ring with respect to the vane bearing ring is transmitted onto the guide vanes, which can be adjusted within a pre-determined range between the open position and the closed position.

In such a VTG, it can be laborious to mount the individual parts of the guiding grid in the housing, since various parts have to be matched, patched and fitted with one another and have to be interconnected, particularly when inserting them into a turbine unit or a turbocharger. Also, any exhaust gas flowing in the gap between vane and adjacent wall "bypasses" the control of the vanes and reduces the efficiency of the VNT. It is desired to fit parts with close tolerances so as to prevent such bypass to the greatest extent possible.

U.S. Pat. No. 6,916,153 (Boening), from which prior art FIGS. 1 and 2 are derived, teaches a "cartridge" type modular guiding grid which is simple, compact, easy to assemble and can quickly be mounted. A whole preassembled unit can be simply inserted into a turbine housing. In such an assembly, mounting of the moving parts is considerably simplified and accelerated because mounting is to an annular disk, and not directly to a wall of the turbine housing. The guiding grid of variable geometry comprises a plurality of guiding vanes in a housing in angular distances around a central axis in an axially extending vane space of a predetermined axial distance. Each vane is pivotal about an associated pivoting axis to assume different angles in relation to the central axis and, thus, to form a nozzle of variable cross-section between each pair of adjacent vanes. A nozzle ring supports the vanes around the central axis and forms a first axial limitation of the vane space. A unison ring is displaceable relative to the nozzle ring and is connected to the vanes to pivot them. An annular disk is fixed to the housing and faces the nozzle ring in an axial distance to form a second axial limitation of the vane space and a central opening. Into this opening, a sleeve may be inserted. A fixing arrangement determines the axial position of the annular disk with respect to the housing.

It would be desirable to adapt a VTG cartridge of the above described type so that it could be used in a pulse-energy enhanced turbine of a turbocharger, wherein exhaust pulsation energy from different cylinders or cylinder groups of the engine or engine bank is kept separated up to the turbine wheel, so that the turbine wheel reacts to individual pulses of exhaust gas flow from engine exhaust ports. For a more detailed explanation of pulse energy and pulse separation, see WO2014193779 (Grissom et al).

SUMMARY OF THE INVENTION

The present invention provides a VNT cartridge for use in a pulse energy enhanced turbine of a turbocharger. According to the invention, in addition to adjustable vanes, at least first and second fixed separating blades 12 (FIG. 3) are provided between a nozzle ring 6 and a disk 29, the separating blades 12 maintaining separation of exhaust gas flows from different cylinders or cylinder groups of the engine or engine bank in a guided grid from divided volute to turbine wheel 11.

BRIEF DESCRIPTION OF THE DRAWINGS

Advantages of the present disclosure will be readily appreciated as the same becomes better understood by reference to the following detailed description when considered in connection with the accompanying drawings wherein:

FIG. 4 illustrates the difference between a "twin" scroll turbine volute (meridionally divided.

DETAILED DESCRIPTION OF THE EMBODIMENTS

Figure 1:
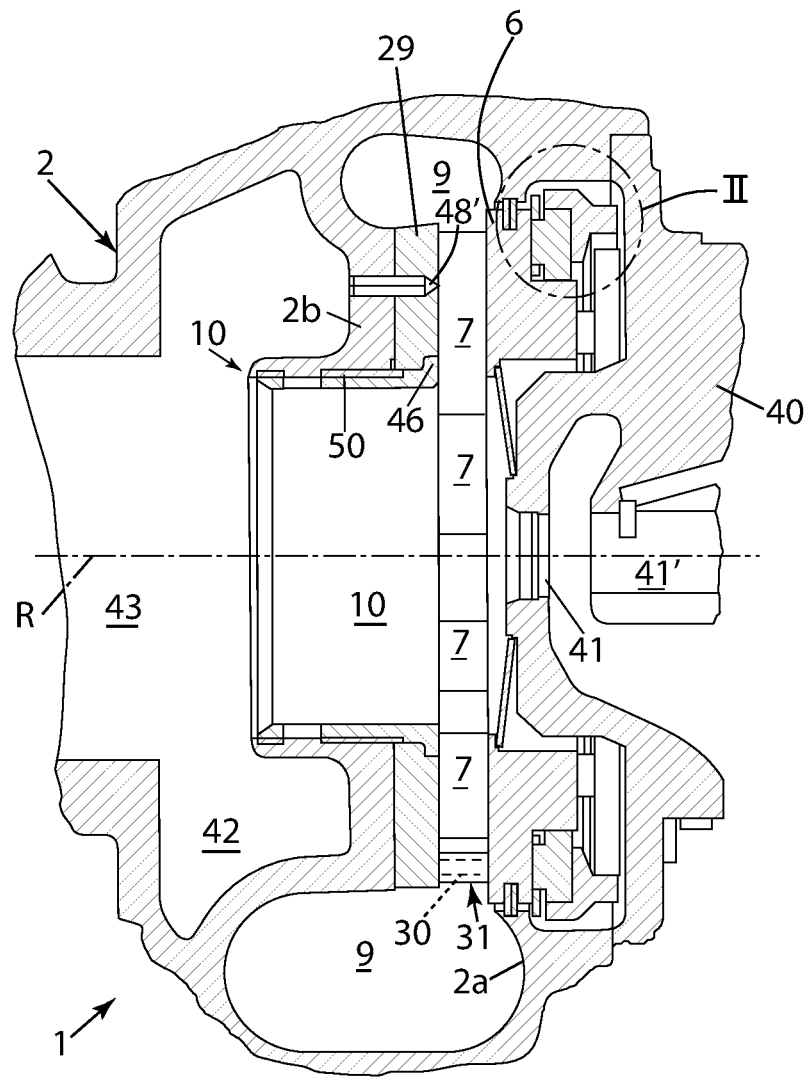
FIG. 1 is an axial cross-section of the transitional region between turbine housing and bearing housing of a turbocharger where a guiding grid is accommodated.

In FIG. 1, a part of a single volute turbine housing 2 of a turbocharger 1 is represented which, typically, comprises a peripheral supply channel or scroll or volute 9 for a fluid spirally wound around a central axis R. This fluid is then channeled inwards radially through a plurality of guiding vanes 7 arranged around a central axis R, to a turbine wheel (not shown) rotating about the central axis R. This turbine wheel is mounted, as is known, at the end of a rotor shaft (also not shown) which is supported in bearings 41 and 41' situated within a bearing housing 40 that is releasably attached to the turbine housing 2 and fastened to it by bolts or V-clamp (not shown). In the case of a turbocharger, this shaft extends through this bearing housing 40 to a compressor wheel located within a compressor housing that is either releasably attached to the bearing housing or may he integrally formed with it. This compressor may be driven in a known manner by the turbine wheel in the turbine housing via the common shaft, thus being driven by the exhaust gases supplied to the turbine housing 2.

Figure 2:
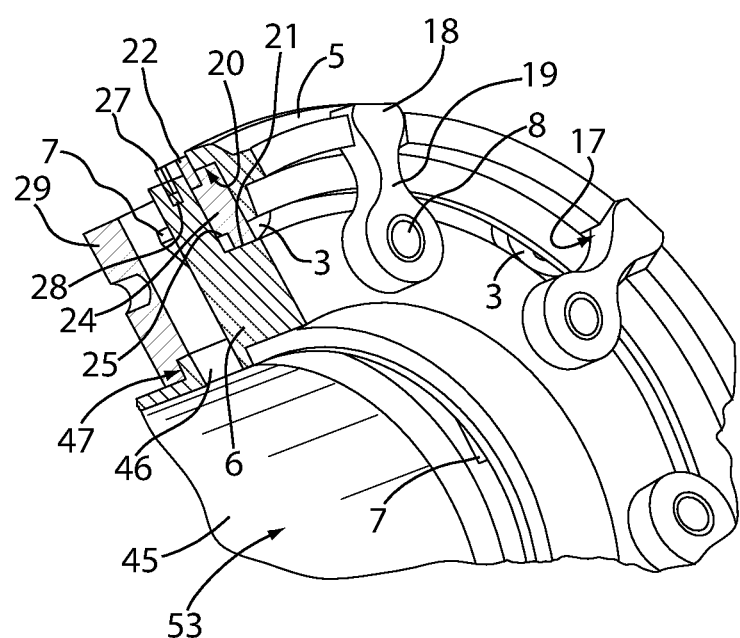
FIG. 2 is a partial, perspective view of the guiding grid illustrating detail II of FIG. 1 at a larger scale.

It is known to make the guiding vanes 7, which form a generally circular guiding grid, pivotable, thus conferring a variable geometry to the guiding grid between one end position in which the vanes 7 are pivoted to be inclined towards the central axis R in a more radial direction and another end position in which they extend approximately tangentially. FIG. 2 shows an antifriction bearing having rolling bodies in the form of rollers 3 between a unison or adjusting ring 5 and a nozzle ring or vane support ring 6 in which adjusting shafts 8 forming pivoting axes of the guiding vanes 7 are supported. Turning and adjusting the adjusting shafts 8, and of the unison ring 5 that actuates them, may be done in a known manner as described in U.S. Pat. No. 6,916,153 (Boening). In any case, the turning movement of the unison ring 5 to pivot relative to the stationary nozzle ring or vane supporting ring 6 provokes a corresponding pivoting motion of the adjusting shafts 8.

The free lever ends or heads 18 of adjusting levers 19 are held in grooves or recesses 17 of the unison ring 5 and fastened or connected to the adjusting shafts 8. Note that in addition to through-passing recesses 17, the grooves could also be provided at the inner axial side of the unison ring 5, as is known, wherein the heads 18 are held so that the heads 18 ensure a pre-centering of the unison ring. This is but one of a variety of possible embodiments. An adjustment can also be effected and transmitted by slot cams or intermeshing gear teeth.

The pivotable guide vanes can be the sole controllers of exhaust flow in the cassette, or an additional ring of fixed guide vanes can be provided in the annular space between the volute and the cassette, to modify the map characteristics of the turbine.

In this way, exhaust gas of a combustion motor, supplied via the supply channel 9, is supplied to a greater or lesser extent to the turbine wheel (not shown) which rotates in the interior of the guiding grid formed by the vanes 7, before the gas is discharged through a pipe 10 extending in axial direction coaxial to the central axis R. This discharge pipe 10 is, in the embodiment shown, decoupled from a following continuation 43 by a decoupling space 42, but can, if desired, be directly connected to an exhaust system.

The unison ring 5 has a radially inwards directed rolling surface 20 upon which the rollers 3 can roll. Preferably, however, this is only provided for compensating tolerances, because in practice it will be preferred if the rollers 3 have a certain play under all operational circumstances both with respect to this rolling surface 20 and in relation to an opposite exterior roller surface 21 of the nozzle ring 6 which forms a shoulder.

As shown in FIG. 2, relatively few rollers 3 will be necessary if a cage ring or holding ring 22 is utilized. Although the rollers could also run in recesses of this holding ring 22, it is advantageous if the rollers 3 have axial projections 24 of a smaller diameter which engage holes 25 of the holding ring 22 so that the latter provides an appropriate distance in a peripheral direction on the one hand, while holding and maintaining the rollers 3 firmly in axial direction on their track with respect to the rolling surfaces 20 and 21.

A sealing ring 27 may be inserted into a sealing groove 28 of the nozzle ring 6. When comparing FIGS. 1 and 2, the nozzle ring 6 is situated in the region of a housing wall portion 2a. In principle, various sealing arrangements are conceivable: Either the sealing ring 27 is formed as a flexible sealing lip engaging the wall 2a. This, in general, would present no problems, because these parts should not move relative to one another during operation. However, it would also be possible that an additional sealing ring or the sealing ring 27 shown could project into a groove of the wall 2a, thus forming a kind of labyrinth sealing, and even a combination of both possibilities or an approach known in the art of sealings is conceivable. In any case, this sealing serves to keep dirt and pollution material away from the antifriction bearing 3, 20, 21, stemming from the region of the supply channel 9.

In a distance defined by spacers 31 arranged on the nozzle ring around the central axis R., a fastening disk 29 is provided which abuts to the turbine housing 2 in the region of a housing flange 2b best seen in FIG. 1. The fastening disk 29 is fastened to the nozzle ring 6 by way of bolts 30, indicated by dotted lines, which extend, for example, through spacers 31, the spacers 31 providing a minimally larger space than would correspond to the width of the vanes 7 in axial direction, as is known, in order not to impede their pivoting movement at all temperature ranges. In this way, the guiding grid as shown in FIG. 2 can readily be pre-assembled to be inserted into the turbine housing 2.

In order to be able to insert the module thus created into the turbine housing 2 in a quick and precise way, it is connected to a sleeve 45 insertable into the central axial pipe 10 and having a central opening 53 so that this sleeve, in principle, needs only to be inserted into this discharge pipe 10. To facilitate this, the sleeve 45 has at least one flange 46 which engages and brings with it the disk 29, and thus preferably the whole guiding grid module, when being inserted into the discharge pipe 10, thus determining the axial position of the module. If in this context the term "at least one driver flange" 46 is used, it should be understood that it would be possible to provide a plurality of driver flange-like claws or projections protruding in radial direction, particularly distributed in equal angular distances. However, it is preferred, if, as shown in FIG. 2, the driver member is formed as a driver flange 46 which extends in radial direction from the sleeve and grasps with recess 47 behind the disk 29 at the side of the vanes and the vane space, although it would, in principle, also be possible to have radially interengaging projections and recesses of the disk 29 and the sleeve 45.

In the embodiment shown, the turbine housing 2 is machined in such a way that inserting the sleeve 45 is effected by way of a sleeve thread 50. Therefore, an inner thread (complementary to sleeve thread 50) has to be cut into the axial pipe 10 into which the sleeve thread can be screwed.

While one example of a cartridge is shown in FIGS. 1-2, it will be understood that the present invention is not limited to this particular design.

Figure 3:
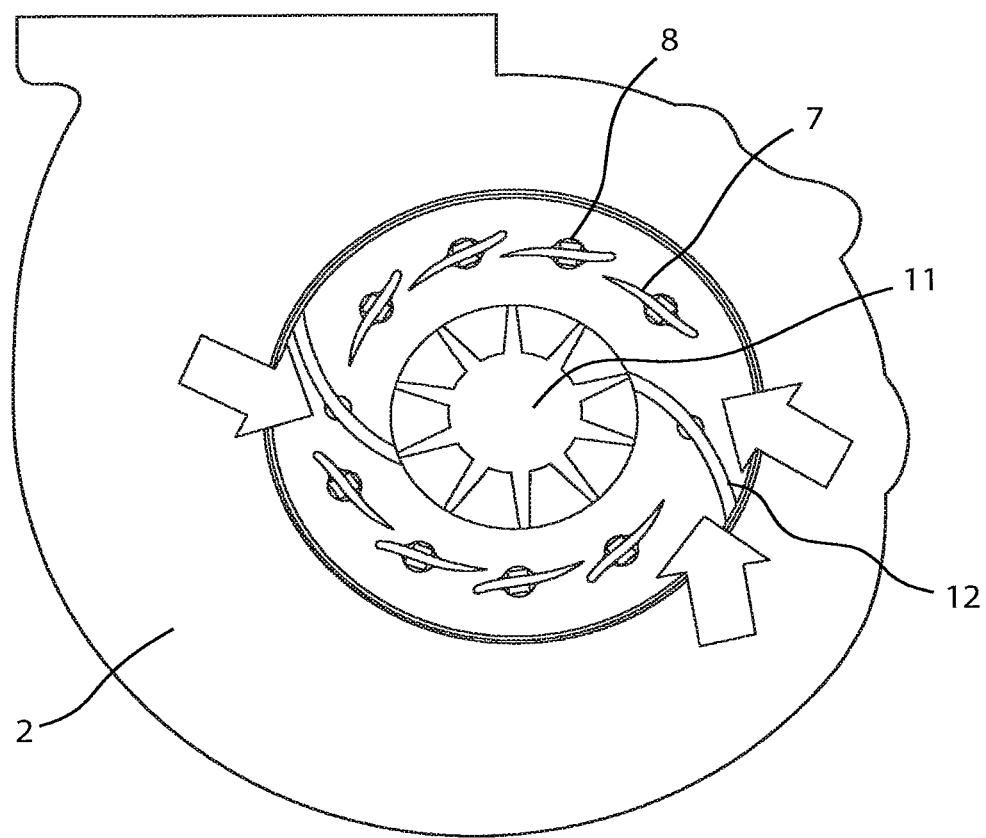
FIG. 3 depicts a first embodiment of the invention with two separating blades.

In accordance with the present invention, as shown in FIG. 3, a VTG cartridge is designed so that two or more separating blades 12 replace or augment at least two VTG vanes 7. The separating blades function to maintain flow separation, which begins in the exhaust manifold and continues through the turbine volute, up to the turbine wheel 11.

The number of guide vanes can be an even number or can be an odd number. The number of separating blades 12 can be two in the case that the exhaust manifold maintains two exhaust channels of separation, or could be three where, for example, the exhaust flow of a three cylinder engine, or one bank of a "V6" engine, is kept separated from engine to turbine wheel.

As explained in WO2014193779 (BorgWarner Inc.), in multi-cylinder engines, cylinders from opposing banks fire alternately. Exhaust gas flow is not a smooth stream because exhaust gases exit each cylinder based on the engine's firing sequence, resulting in exhaust gas pulses. In the case of a "V" engine, the banks are separated across the engine. In the case of an inline engine, the banks could simply be the front cylinders versus the back cylinders. The exhaust gas is conducted to the turbine housing in separate manifold pipes. The separate gas streams serve to preserve the "pulse" of pressure that occurs when the exhaust gas is released from the cylinder. The preservation of the pulses may be desirable because the extra pulse of pressure can start the turbine moving faster. This can be helpful in reducing turbo lag.

This separation of pulse begins at the exhaust of each cylinder, and is maintained in the exhaust manifold up to the turbine inlet. In the region where the exhaust gases are admitted to the turbine housing, a separator wall between the, e.g., two halves of the volute can help preserve the separation between exhaust gases from each cylinder or cylinder group, and thus maintain the pressure pulses.

Figure 4A:
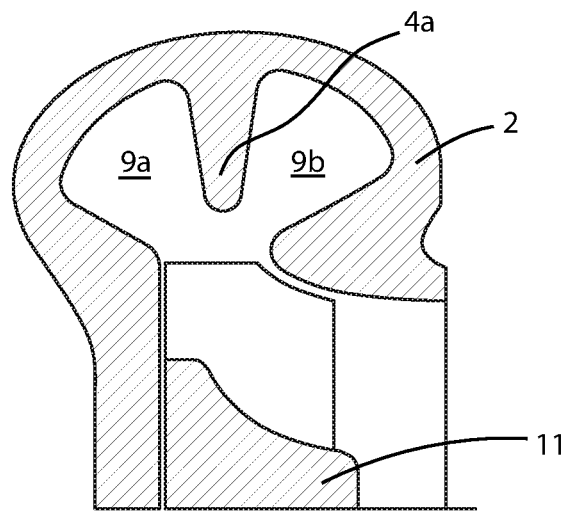
FIG. 4a) and a "dual" scroll turbine volute (sector divided.
Figure 4B:
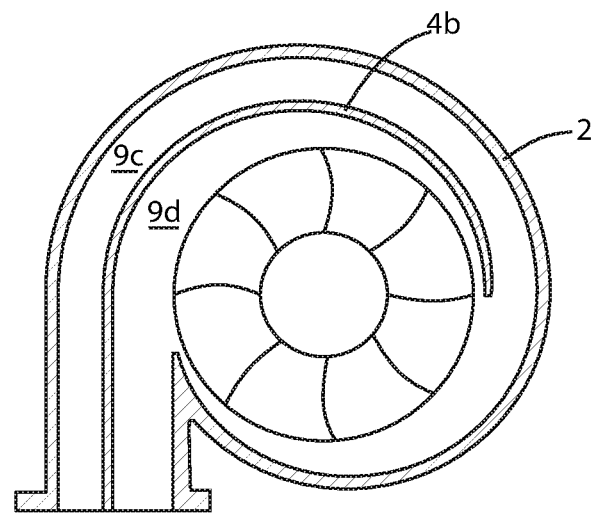
FIG. 4b)

The exhaust manifold feeds exhaust gas to the scroll or volute (hereafter volute) of the turbine housing. The volute transitions exhaust gas from the linear flow in the exhaust manifold to an arcuate flow for distribution of exhaust around the circumference of the turbine wheel. In multi-scroll turbines, also referred to as multi-volute turbines, the volutes may be "twin" scroll or flow (meridionally divided with wall 4a to form volutes 9a, 9b; FIG. 4a) or "dual" volute (sector divided with wall 4b to form volutes 9c, 9d; FIG. 4b).

As one example, gas flow from certain cylinders of an in-line four-cylinder engine, such as cylinders 2 and 3, may pass through one branch (passageway) of the manifold, and gas from other cylinders, such as 1 and 4, pass through a separate branch. Gas flow from each branch from respective cylinders stays divided in the twin-scroll in the volute of the turbine housing. The resulting two feed ports (2 and 3 with 1 and 4) deliver opposite and substantially equal tiring pulsations to improve turbine efficiency and reduce manifold complexity. Divided manifold runners, such as for in-line four cylinder configurations ,enhance pulse utilization by separating exhaust flow with alternating pulses. Similarly, a six-cylinder configuration may have flow from cylinders 1, 2 and 3 combined and cylinders 4, 5 and 6 combined as separate branches into two feed ports providing alternating pulses. Twin-scroll turbo systems may have higher back-pressure at low rpm (which may help turbo spool-up) and lower backpressure at high rpm (which may help top-end performance). Thus, it is desired to further improve on separate passageways for preserving individual pukes to the turbine wheel. It is within the scope of the invention to provide valving for throttling the exhaust gas flow to at least one volute for increasing back pressure as desired. Further yet, it is possible to use the present turbocharger in combination with an engine employing cylinder deactivation, as shown for example in US2016/0138501 A1. Here, in the case of a four cylinder engine, two cylinders would be deactivated, the engine would continue to run on the remaining two active cylinders, and the exhaust from the two active cylinders would flow to one of the two volutes, while the other of the two voultes would receive no exhaust gas flow.

FIG. 3 shows the most basic form of VTG cartridge according to the invention, fitted with two separating blades 12 dividing the guide grid circumferentially into two sectors, each occupying 180°. The scrolls could also be unequal, for example, dividing the guide grid into 175° and 190° sectors, for durability or acoustic reasons. Also, there may be an odd number of vanes rather than an even number as shown. In the case of a cassette divided as shown in FIG. 3, each engine exhaust port directs individual pulsations onto the turbine wheel with resulting alternate pulsations across the face of the turbine wheel.

In VTG cartridges with uneven numbers of VTG vanes, the replacement of at least two VTG vanes 7 with separating blades 12 will lead to open areas 13 beneath the separating blades (see FIG. 3 wherein three vanes are replaced by two separating blades). In practice, this forces the VTG vanes to be more closed to achieve the same mass-flow than a standard VTG. This will lead to a lower efficiency.

Figure 5:
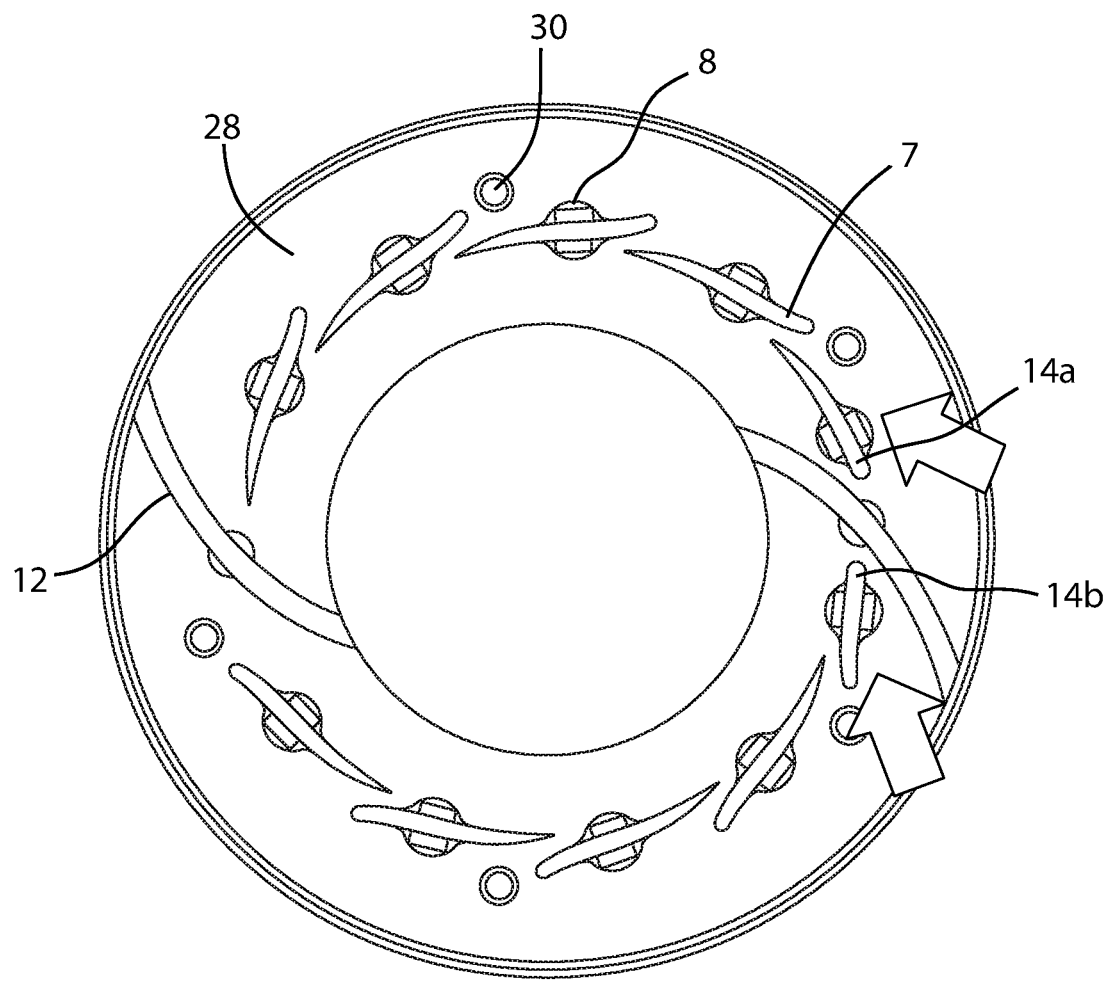
FIG. 5 shows a second embodiment of the invention with stub vanes.

As a countermeasure, "stump vanes" 14 with either a vane leading stump edge 14a or a vane trailing stump edge 14b can be installed adjacent the full separating blades 12 (see FIG. 5), particularly if, beginning with an uneven number of VTG vanes, two vanes next to each other have been removed, to achieve an equal number of vanes in each scroll. At closed VTG positions these stump vanes reduce the overall open area so that the VTG can be pivoted between open and closed positions to achieve the same range of massflow.

Figure 6:
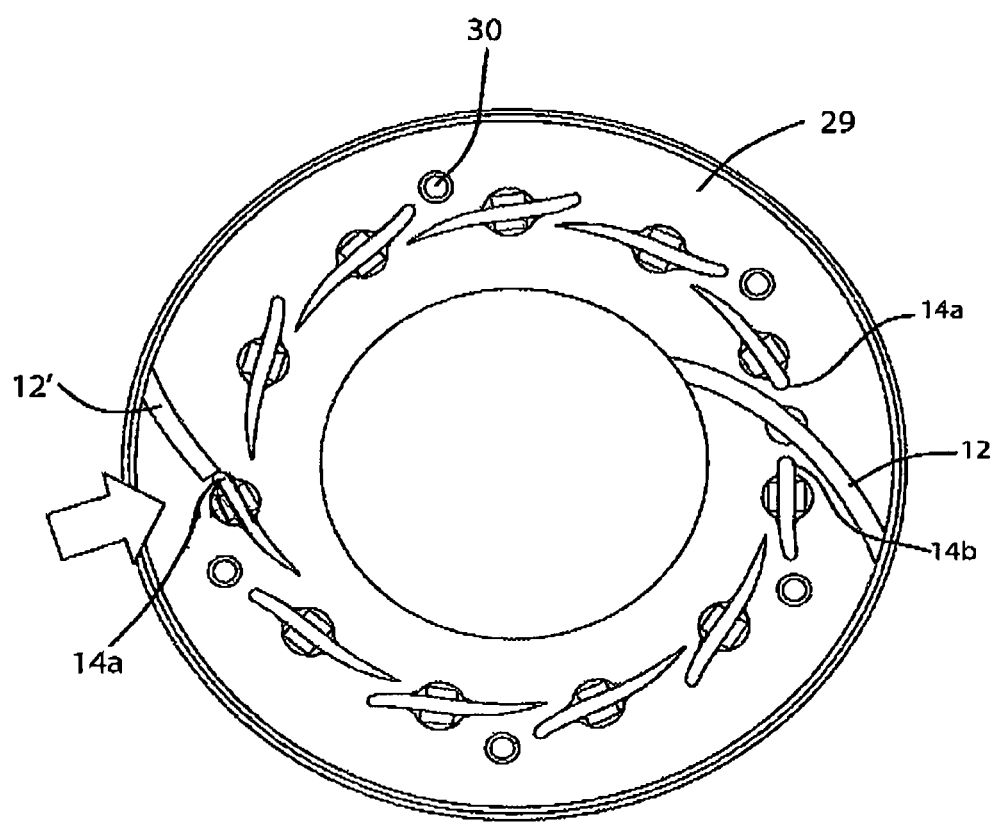
FIG. 6 shows a third embodiment of the invention with stub vanes and a stub separating blade.

To further reduce the overall open area another possibility is to provide a stump separating blade 14 close to a stump vane 12' as shown in FIG. 6. FIG. 6 illustrates a single stump separating blade and stump vane as would be an exemplary embodiment in the case that one of a odd number of vanes is being replaced. In the case that the original guiding grid is made of an even number of vanes, an exemplary embodiment would comprise replacement of two vanes with two stump separating blades and two stump vanes. The two sets of stump vanes and blades could be opposite each other, dividing the guide grid into two equal sectors, or they could be offset, dividing the guide grid into unequal sectors for durability or acoustic reasons. Assuming that most of the static pressure of the flow is converted to dynamic pressure at this position a small clearance between the separating blade and the vane should not increase the leakage dramatically (see FIG. 7).

In place of the spacers comprised of bolts 30 and sleeves 31 as shown in FIG. 1, it is possible to use pins 15 securely connected to either one of the disks or rings by welding or compression fit, which pins can be received in locating bores 16 in the opposing face of the opposite disk or ring.

Other possibilities to reduce the open area of the cartridge include a change of the thickness of the separating blades. This could be done with increasing and decreasing thickness of the blade over the blade length. Also, a separating blade with its thickest point at the radius of the closed VTG vanes is possible to avoid a big blockage of the wheel.

Figure 7:
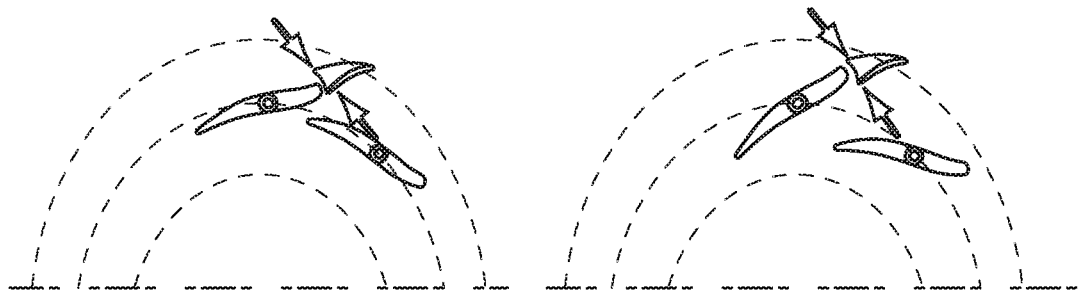
FIG. 7 shows a version of the third embodiment, with guide vanes in different positions.
Figure 7:
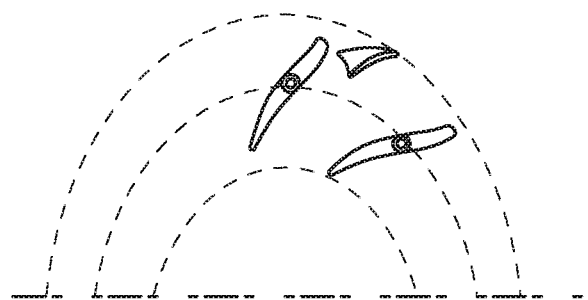

One solution for a complete VTG cartridge with an even number of VTG vanes with pulse separation would be to separate the two scrolls up to the outer diameter of the VTG vane turning radius (See FIG. 7). The separating blade would need a contour which tightens the space between blade & VTG-vane up to a defined VTG vane position. The contour can then be designed, so that a separation of the scrolls is reached up to the desired position and when the VTG-vane is open the scrolls are flow-connected in the VTG cartridge. The separating blade can also be designed as a supporting element, so that it can replace the pins or spacers.

To avoid or minimize the leakage from the admitted to the non-admitted scroll under partial admission conditions several measure can be realized. The installation of a standard VTG cartridge in the turbine housing leads to several connections between the two scrolls especially at the two tongues of the scrolls. Countermeasures include (See FIG. 8):

A. A nib or peak on the disc to ensure a minimal clearance between disc and the turbine housing (TH) (see FIGS. 8, 10-12 and 14)

B. An increase of the outer diameter of the Vane Bearing Ring (VBR) to ensure a minimal radial clearance between the VBR and the turbine housing (TH)

C. Removal of the chamfer of the VBR to ensure a minimal axial clearance between VBR and Separating Blade To reduce the production tolerance all three parts can be turned to the specified diameter when the cartridge is assembled.

Figure 8:
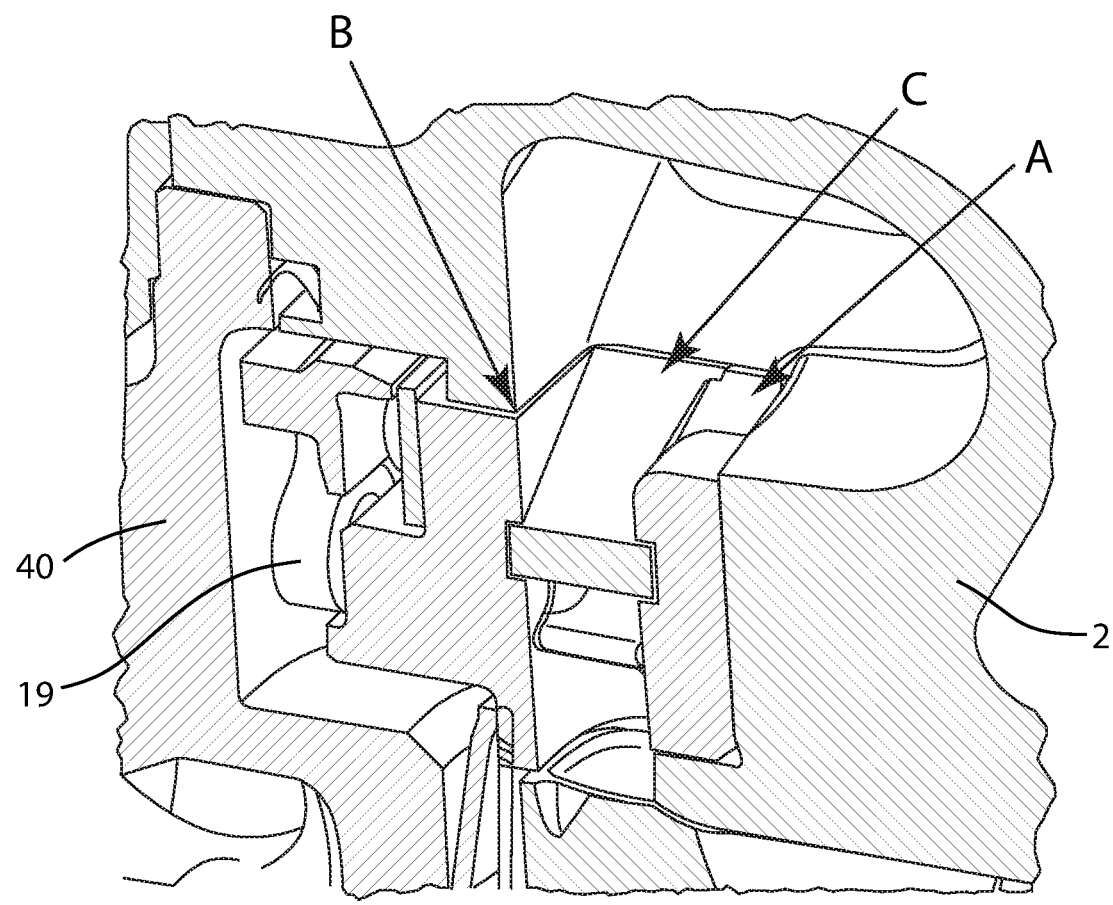
FIGS. 8, 9 show the installation of a cartridge according to the invention in a turbine housing.
Figure 9:
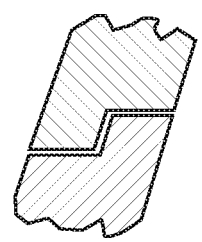

To increase the tightness of the connection and ensure an exact mounting position of the cartridge, a nose can be manufactured in the tongue of the TH and the opposite contour in the VBR (see FIGS. 8 and 9). This could replace a pin between the bearing housing (BH) and the VTG cartridge for fixation reasons.

Figure 10:
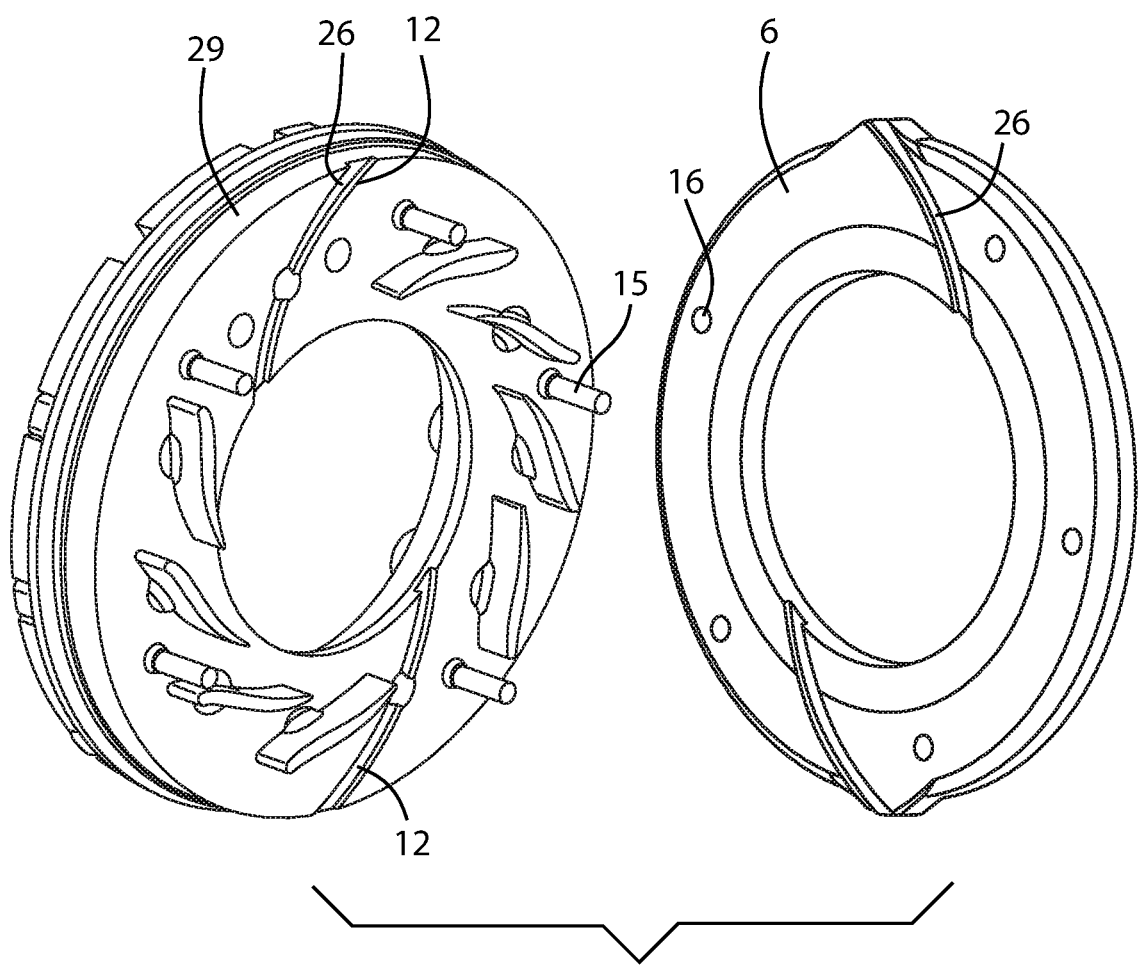
FIG. 10 shows use of pins for locating and connecting nozzle ring and disk, with grooves in which separating blades may be seated with a supporting function.
Figure 11:
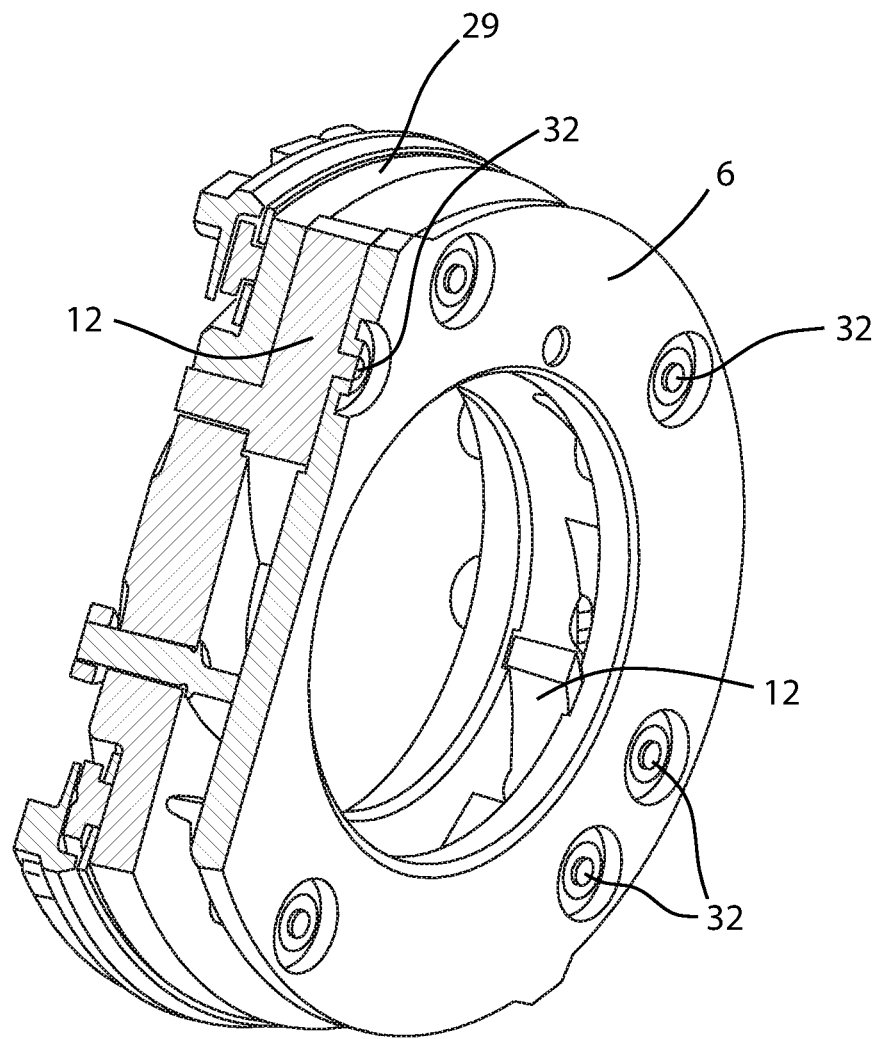
FIG. 11 shows a cartridge according to the invention wherein separating blades are provided with pins, and wherein only part of the blade has a separating function.

To reduce the leakage between the separating blade 12 and vane bearing ring (VBR) 29, or between separating blade 12 and disc 29, grooves 26 are machined in the VBR and the disc (see FIG. 10). The width of the separating blade 12 is increased as compared to the separating blade positioned between flat walls of discs with no groove, so that in the case of the separating blade seated in groove 26, the overall distance between VBR and disc stays the same. Due to the groove 26 the number of sealing surfaces is increased from one to three, which leads to a better sealing.

In addition to the sealing capabilities, the separating blade 12 can be used as a supporting element. The connection can be realized by any type of joining method between the separating blade and VBR or disc. Also, the separating blade can be installed by a number of pins 32 on the separating blade which are connected to the VBR or disc (See FIG. 11). The number and distribution of the pins can be varied according to the needed support of the cartridge. This gives the possibility to remove some/all of the standard locating pins in respect to the supporting capability of the separating blade.

The separating blade could also be connected to the VBR or disc in a way that only a part of the blade has a supporting function and the other part leaves space for thermal distortion of the cartridge. In this case a solution were the outer part of the separating blade is supporting and the inner part at the exit of the VTG cartridge is leaving space would also reduce the leakage because of the above stated conversion of static to dynamic pressure during the way through scrolls, nozzle and cartridge.

Figure 12:
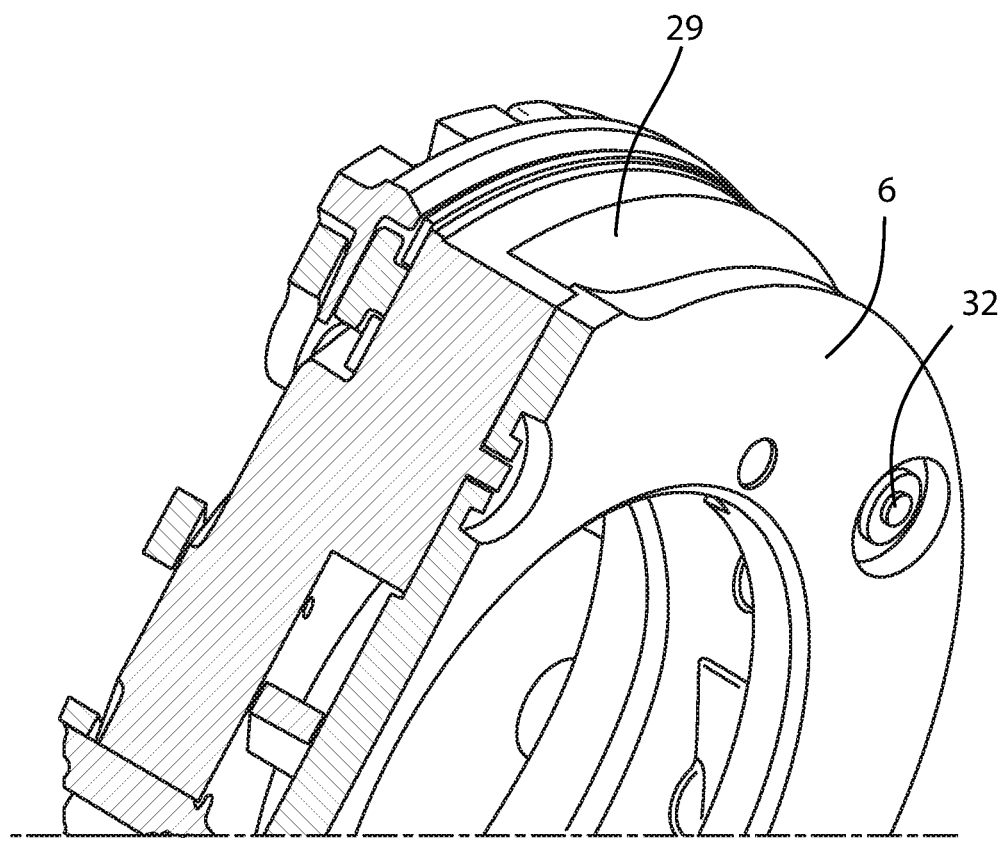
FIGS. 12-14 are different views of a vane bearing ring formed as one piece with separating blades.
Figure 13:
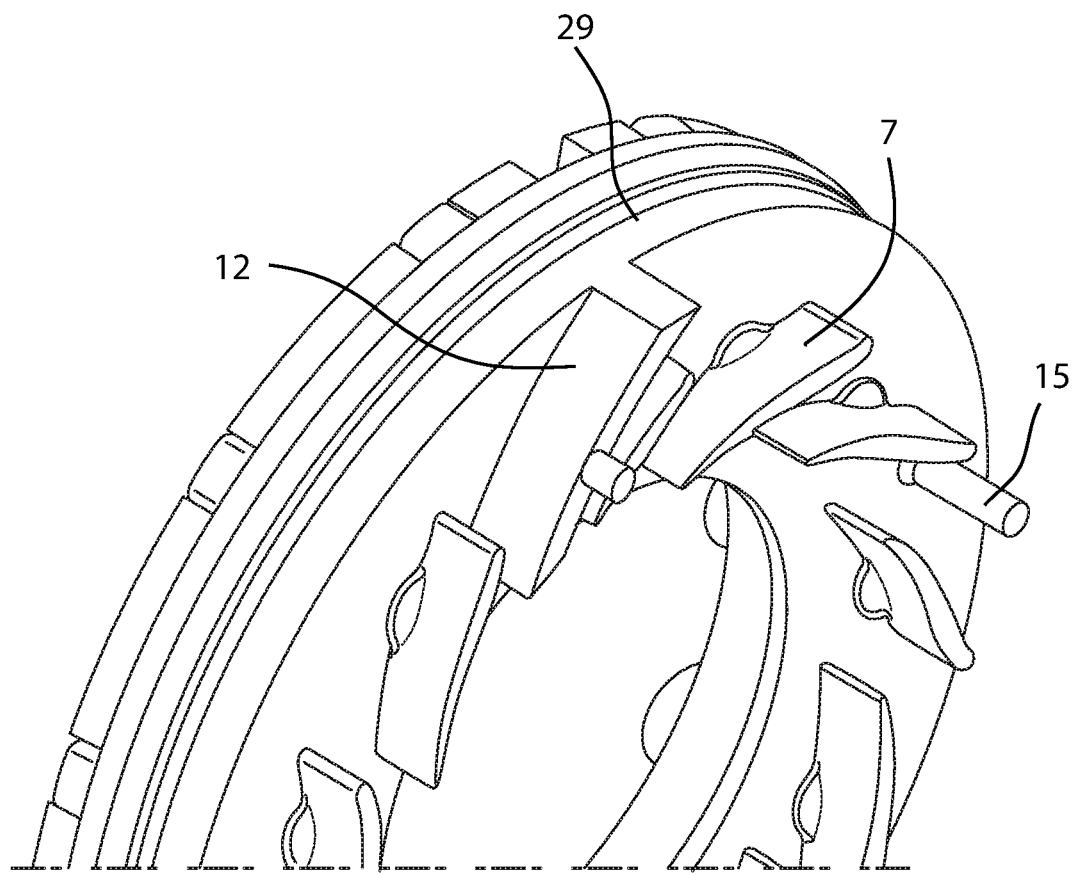
Figure 14:
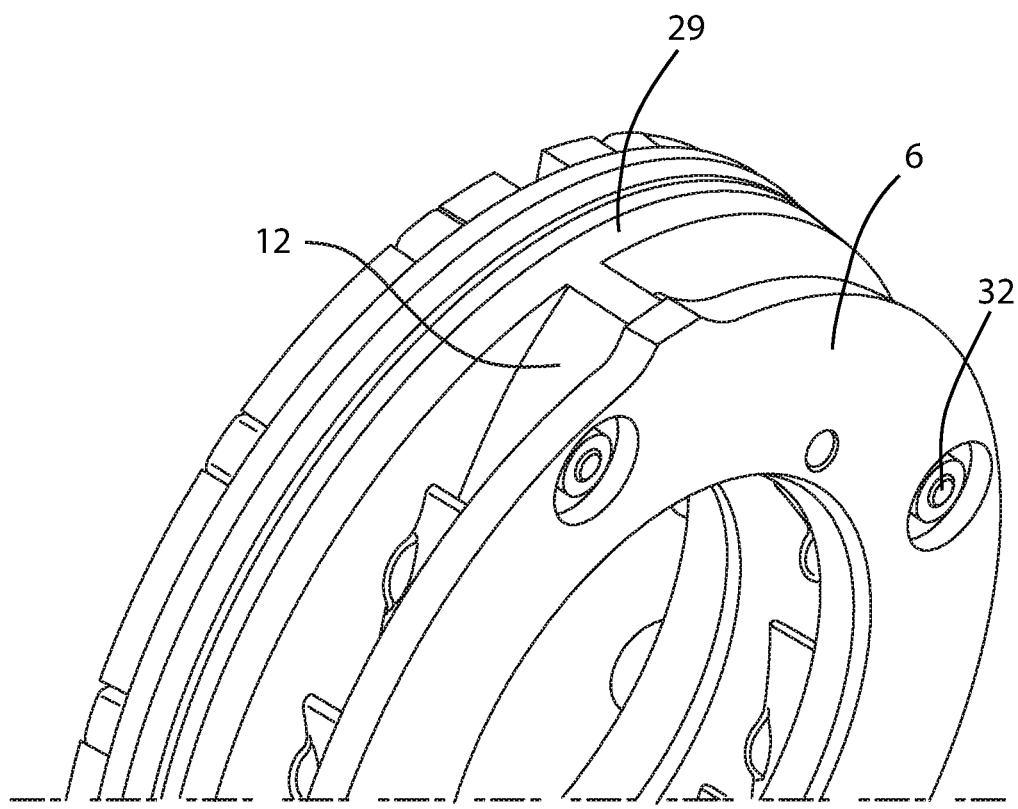

An optional possibility for manufacturing would be to produce the vane bearing ring and the separating blades as one piece as shown in FIGS. 12-14. Here the costs for the groove and the welding of groove and separating blade would be omitted. Further, it would be possible to mill the separating blade$_{[krsl2]}$ and disc as one piece.

To prevent the various cylinders of a four cylinder engine, or two cylinders of one bank of a four cylinder engine, from interfering with each other and not loosing kinetic energy during the charge exchange cycles, in the illustrated example a single cylinder is connected with each volute. The separating blades 12 according to the invention modify the VTG cartridge so that it can be used in pulse turbocharged commercial diesel engines, wherein twin-entry turbines allow exhaust gas pulsations to be optimized, because a higher turbine pressure ratio is reached in a shorter time. Thus, through the increasing pressure ratio, the efficiency rises, improving the all-important time interval when a high, more efficient mass flow is passing through the turbine. As a result of this improved exhaust gas energy utilization, the engine's boost pressure characteristics and, hence, torque behavior is improved, particularly at low engine speeds.

The exhaust gas stream becomes a lower total pressure exhaust gas stream while passing through the blades, and is subsequently axially released via a turbine outlet into an exhaust system.

It should be noted that the system may include multiple turbines arranged in a serial configuration, a parallel configuration, or combination serial/parallel configuration.

After exiting the turbine, the exhaust may be discharged to the atmosphere through an aftertreatment system that may include, for example, a hydrocarbon closer, a diesel oxidation catalyst (DOC), a diesel particulate filter (DPF), and/or any other treatment device known in the art.

REFERENCE NUMBER LIST

1 Turbocharger
2 Turbine housing
3 Rollers
4 Bearing housing
5 Unison ring
6 Nozzle ring
7 Guiding vanes
8 Adjusting shafts
9 Supply channel
10 Pipe
11 Turbine wheel
12 Separating blade
13 Open area
14 Stump blade
15 Pin
16 Locating bore
17 Recesses
18 Heads
19 Adjusting levers
20 Rolling surface
21 Exterior roller surface
22 Cage ring
24 Axial projections
25 Holes
26 Groove
27 Sealing ring
28 Sealing groove
29 Disk
30 Bolts
31 Traversing sleeves
32 Blade pin
40 Bearing housing
41, 41' Bearings
42 Decoupling space
43 Following continuation
44 Spacer
50 Thread
53 Central opening

What is claimed is:

1. A turbocharger turbine comprising:
a turbine housing (2) that houses a turbine wheel (11), said turbine wheel rotatable about an axis of rotation (R), said turbine housing (2) including a divided volute adapted for receiving divided exhaust gas flows from an engine and maintaining separation of exhaust gas flows from different cylinders or cylinder groups of the engine; and
a variable turbine geometry cartridge mounted in said turbine housing and comprising:
a plurality of guide vanes (7, 14a, 14b) arranged in said turbine housing (2) downstream of said divided volute, in angular separation around said axis of rotation (R) in an axially extending vane space, each guide vane (7, 14a, 14b) being pivotal about an associated pivot axis, said guide vanes (7, 14a, 14b) controlled in unison to pivot between a fully open position and a fully closed position thereby forming nozzles of variable cross-section between adjacent guide vanes of the plurality of guide vanes (7, 14a, 14b), wherein said plurality of guide vanes (7, 14a, 14b) includes at least one first guide vane (7) having a first vane length and at least one second guide vane (14a, 14b) having a second vane length, said second vane length being different from said first vane length, each guide vane (7) having a leading edge having a length and a trailing edge having a length;
an annular nozzle ring (6) for supporting said guide vanes (7, 14a, 14b) for pivoting about their respective said pivot axis, said nozzle ring (6) forming a first axial limitation of said vane space;
a disk (29) with a central opening, said disk connected to and spaced from said nozzle ring (6) at a predetermined axial distance to form a second axial limitation of said vane space, and
at least a first and a second flow separating means for continuing separation of exhaust gas flows from said divided volute to said turbine wheel (11), wherein
said first flow separating means for continuing separation of exhaust gas flows is a first fixed separating blade (12) provided between said nozzle ring (6) and said disk (29) and adapted for continuing separation of exhaust gas flows from said divided volute to said turbine wheel (11), and
said second flow separating means for continuing separation of exhaust gas flows is comprised of
a partial fixed separating blade (12') provided between said nozzle ring (6) and said disk (29) and extending part of a radial distance between the divided volute and said turbine wheel and
a flow separating guide vane (14a) of the plurality of guide vanes adapted for pivoting between a first position and a second position and adapted in one of said first and second positions to cooperate with said partial fixed separating blade (12') for continuing separation of exhaust gas flows from said divided volute to said turbine wheel (11).

2. The turbocharger turbine as in claim 1, wherein the cartridge includes a unison ring (5) pivotable around said axis of rotation (R) relative to said nozzle ring (6), said unison ring (5) being operatively connected to said plurality of guide vanes (7, 14a, 14b) in order to pivot said plurality of guide vanes (7, 14a, 14b) about their pivot axis when said unison ring (5) is pivoted.

3. A turbocharger turbine comprising:
a turbine housing (2) that houses a turbine wheel (11), said turbine wheel rotatable about an axis of rotation (R), said turbine housing (2) including a divided volute adapted for receiving divided exhaust gas flows from an engine and maintaining separation of exhaust gas flows from different cylinders or cylinder groups of the engine; and
a variable turbine geometry cartridge mounted in said turbine housing and comprising:
a plurality of guide vanes (7, 14a, 14b) arranged in said turbine housing (2) downstream of said divided volute, in angular separation around said axis of rotation (R) in an axially extending vane space, each guide vane (7, 14a, 14b) being pivotal about an associated pivot axis, said guide vanes (7, 14a, 14b) controlled in unison to pivot between a fully open position and a fully closed position thereby forming nozzles of variable cross-section between adjacent guide vanes of the plurality of guide vanes (7, 14a, 14b), wherein said plurality of guide vanes (7, 14a, 14b) includes at least one first guide vane (7) having a first vane length and at least one second guide vane (14a, 14b) having a second vane length, said second vane length being different from said first vane length, each guide vane (7) having a leading edge having a length and a trailing edge having a length;

an annular nozzle ring (6) for supporting said guide vanes (7, 14a, 14b) for pivoting about their respective said pivot axis, said nozzle ring (6) forming a first axial limitation of said vane space;

a disk (29) with a central opening, said disk connected to and spaced from said nozzle ring (6) at a predetermined axial distance to form a second axial limitation of said vane space, and at least a first and a second flow separating means for continuing separation of exhaust gas flows from said divided volute to said turbine wheel (11), wherein each of said first flow separating means for continuing separation of exhaust gas flows and said second flow separating means for continuing separation of exhaust gas flows are comprised of a partial fixed separating blade (12') provided between said nozzle ring (6) and said disk (29) and extending part of a radial distance between the divided volute and said turbine wheel and a flow separating guide vane (14a) of the plurality of guide vanes adapted for pivoting between a first position and a second position and adapted in one of said first and second positions to cooperate with said partial fixed separating blade (12') for continuing separation of exhaust gas flows from said divided volute to said turbine wheel (11).

4. The turbocharger turbine as in claim 3, wherein the cartridge includes a unison ring (5) pivotable around said axis of rotation (R) relative to said nozzle ring (6), said unison ring (5) being operatively connected to said plurality of guide vanes (7, 14a, 14b) in order to pivot said plurality of guide vanes (7, 14a, 14b) about their pivot axis when said unison ring (5) is pivoted.

* * * * *